Patented Jan. 14, 1941

2,228,496

UNITED STATES PATENT OFFICE 2,228,496

7-AMINO-CHOLESTEROL COMPOUND AND MANUFACTURE THEREOF

Adolf Windaus and Hans-Joachim Eckhardt, Gottingen, Germany, assignors to Winthrop Chemical Company, Inc., New York, N. Y., a corporation of New York No Drawing. Application January 31, 1939, Serial No. 253,814. In Germany February 2, 1938

4 Claims. (Cl. 260—397)

This invention relates to 7-amino-cholesterol compounds and to a process of manufacturing the same.

7-keto-cholesterol which formerly has been designated "beta-hydroxy-cholestenol," its acetate respectively, cannot be transformed into the corresponding phenylhydrazones by means of phenyl-hydrazine (compare "Monatshefte für Chemie" 17 (1896), pages 594–595). It was therefore to be assumed that the keto-group of the said compounds has such a slight reactivity, that it cannot be transformed into its usual keto-derivatives.

In accordance with the present invention it is most surprising that 7-keto-cholesterol, its esters respectively, for instance, 7-keto-cholesteryl-acetate or -benzoate can be converted into the corresponding ketoximes by means of hydroxyl-amine and that these oximes can be transformed into the corresponding amines by means of a reducing agent. The reducing agent should have such an activity that the double bond standing in the cholesterol molecule is not simultaneously reduced. Sodium and alcohol have proved as advantageous reducing agent for the said purpose. The amino compounds thus obtainable probably represent a mixture of two stereo-isomeric amines. They may be transformed into the corresponding N-alkyl substitution products and into their acyl derivatives by means of alkylating and acylating agents. Apart from the amino-group also the hydroxyl-group of the cholesterol molecule may be acylated.

The invention is further illustrated by the following example without being restricted thereto:

10 grs. of 7-keto-cholesterylacetate are dissolved in 150 ccms. of hot alcohol. An alcoholic solution of hydroxylamine, prepared from 4 grs. of hydroxylamine-hydrochloride and 6 grs. of sodium acetate is added. After boiling for 6 hours under reflux the oxime formed precipitates on cooling in shining leaflets. It is easily soluble in ether, chloroform and hot acetic ester, not as easily in ethanol and methanol. Small prisms are obtained from a mixture of acetic ester and methanol, melting at 184° C. The 7-ketoxim-cholesterol is obtained therefrom in needles melting at 235° C. by treatment with 5% methyl-alcoholic potassium hydroxide solution. 3 grs. of 7-ketoxim-cholesterylacetate are dissolved in 60 ccms. of hot absolute alcohol. 45 grs. of sodium and 500 ccms. of alcohol are added to the solution in the course of some hours. The mixture is heated on the water-bath. As soon as the sodium has been consumed the mixture is treated with 1.5 liters of water and extracted with ether several times. The ether is evaporated from the united extracts under reduced pressure. The remaining oil is dissolved in about 20 ccms. of alcohol; 2-n-hydrochloric acid is carefully added to the warm solution until it is just rendered turbid. On cooling the 7-amino-cholesterol-hydrochloride precipitates in small needles. It is easily soluble in methanol, not easily soluble in alcohol and chloroform, insoluble in water, ether and petroleum ether. On recrystallizing from alcohol and dilute hydrochloric acid, it melts at 270° C. while decomposing. The melting point of the mixture of the isomeric compounds formed can be raised up to 280° C. by continued recrystallization. The free base is obtained when treating the hydrochloride with methyl-alcoholic potassium hydroxide solution and extracting the mixture after dilution with water by means of ether. The 7-amino-cholesterol is obtained from the residue of the ethereal solution by means of acetone in solid prisms melting at 167–170° C.

When adding aqueous solutions of the corresponding acids to the alcoholic solution of the base there are obtained the phosphate melting at 277–280° C., the sulfate melting at 145° C., the borate melting at 260–265° C.; the oxalate is obtained from the ethereal solution on the addition of oxalic acid; it melts at 210–215° C.

When treating the 7-amino-cholesterol with acetic acid anhydride in ethereal solution, crystals of the α-7-acetylamino-cholesterol melting at 290° C. precipitate after short storage. The beta-7-acetylamino-cholesterol melting at 266–268° C. is obtained from the mother liquors. The α-7-acetylamino-cholesterylacetate melting at 210° C. is obtained when reacting upon 7-amino-cholesterol with acetic acid anhydride in the presence of pyridine while heating on the water-bath. The 7-benzoylamino-cholesterol is obtained in needles melting at 240° C. upon refluxing the 7-aminocholesterol with benzoic acid anhydride in benzene solution; upon storing the base in pyridine with benzoylchloride during 2 days at room temperature, the 7-benzoylamino-cholesteryl-benzoate is obtained in needles melting at 252° C. after recrystallization from a mixture of ether and methanol.

The 7-methylaminocholesterol-hydroiodide melting at 249–251° C. is obtained when reacting 7-aminocholesterol with methyliodide in ethereal solution. When converting the hydroiodide into the free base by the addition of alkali and again treating with methyliodide in ethereal solution, unchanged starting material first separates from the mixture; the 7-dimethylamino-cholesteryl-oxalate is obtained in crystals when adding to the mother liquor an ethereal solution of oxalic acid. The oxalate melts at 184° C. after recrystallization from hot alcohol containing a certain quantity of aqueous oxalic acid solution. The free base obtained from the oxalate in the usual manner melts at 160° C. The 7-dimethylamino-cholesterol may also be obtained in one working stage when boiling the aminocholesterol in methanol solution during several hours while adding excess methyliodide and potassium hydroxide in portions.

We claim:

1. A compound selected from the group consisting of 7-amino-cholesterol, its N-lower-alkyl substitution products, its acyl-derivatives and the salts of the afore-mentioned non-N-acylated compounds with acids.

2. 7-amino-cholesterol.

3. The process which comprises reacting a compound of the group consisting of 7-ketocholesterol and its acyl-derivatives with hydroxylamine and reducing the 7-ketoxim-compound formed to the 7-amino-compound by means of sodium and alcohol.

4. The process which comprises reacting upon 7-ketocholesteryl-acetate with hydroxylamine and reducing the 7-ketoxim-cholesteryl-acetate obtained to the 7-aminocholesterol by means of sodium and alcohol.

ADOLF WINDAUS.
HANS-JOACHIM ECKHARDT.